D. M. WESTON.
Centrifugal Machine for Creaming Milk.
No. 241,172. Patented May 10, 1881.
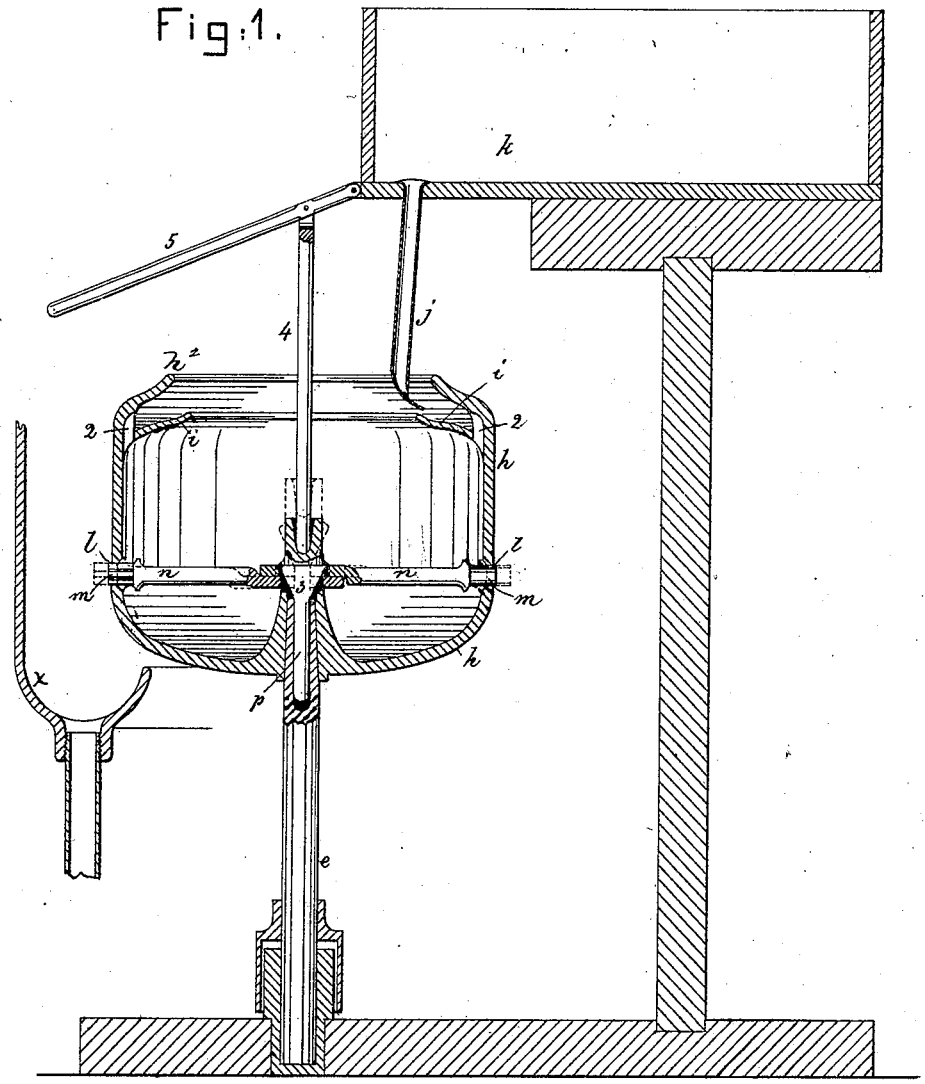
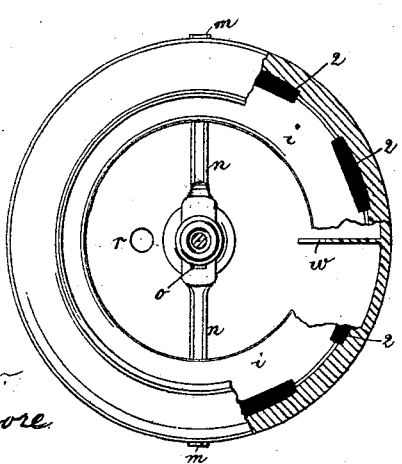
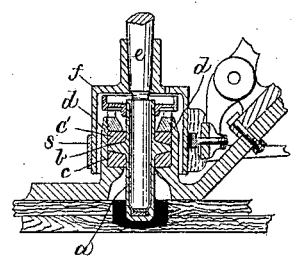
Witnesses.
Lawrence F. Connor
Jos. P. Livermore
Inventor.
David M. Weston
by Crosby & Gregory
Attys

UNITED STATES PATENT OFFICE.

DAVID M. WESTON, OF BOSTON, MASSACHUSETTS.

CENTRIFUGAL MACHINE FOR CREAMING MILK.

SPECIFICATION forming part of Letters Patent No. 241,172, dated May 10, 1881.

Application filed March 21, 1879.

*To all whom it may concern:*

Be it known that I, DAVID M. WESTON, of Boston, county of Suffolk, and State of Massachusetts, have invented an Improvement in Centrifugal Machines for Creaming Milk, of which the following description, in connection with the accompanying drawings, is a specification.

This invention relates to centrifugal machines for creaming milk, as will be hereinafter described.

My invention consists in a centrifugal machine for creaming milk provided with a drum having solid bottom and sides and a connected internal feeding-annulus, and having perforations at its outer side, below the said annulus, to permit the discharge of the heavier liquid material, substantially as hereinafter described.

This my present invention is an improvement on that class of machines for separating liquids from denser materials which is represented in United States Letters Patent No. 74,021, heretofore granted to me, this present invention being, however, so improved as to render it very advantageous for use in creaming milk, or in that process which consists in separating cream from the milk while sweet.

Figure 1 of the drawings represents, in vertical section, an apparatus illustrating one form of machine embodying my invention; Fig. 2, a top view of the drum or basket, a portion of its upper part being broken away to show the feeding annulus or shelf; and Fig. 3, a detail illustrating the construction of the lower bearing of the spindle of a centrifugal machine such as is now commonly made by me, the said figure showing the form of under or spindle bearing which I shall in practice employ.

Referring first to Fig. 3, the lower bearing, $a$, provided with an annular projection or collar, $b$, rests upon an india-rubber or other elastic ring, $c$, and above the said collar is a second india-rubber or elastic ring, $c'$. The two rings $c\ c'$ are held within an inclosing-case, $d$, and the spindle $e$, placed within the said bearing, has a hooded whirl, $f$, which is extended downward about the bearing. This construction of bearing and manner of supporting it and the spindle is now commonly used in my centrifugal machines, and is that which will be employed in working machines for creaming milk, and in a machine so constructed the bearing and spindle within it will be free to yield easily to compensate for inequalities in loading the spindle and its vibrations, as specially described in United States Reissued Letters Patent No. 8,489, granted to me November 12, 1878. The spindle $e$, its lower bearing, and whirl $f$ will be as usual in my centrifugal machines, to which reference has been had. The spindle $e$ is supported and steadied at its lower end only, and it may thereby center itself to unequal loading.

The drum or basket $h$, made preferably of plate-steel of proper strength, is mounted upon the upper end of the spindle $e$. This drum is made, as shown in Fig. 1, closed and bowl-shaped at its lower portion and open at the top.

Within the drum $h$, and below its open top, is a feeding annulus or shelf, $i$, the central opening of which is preferably of less diameter than is the opening at the top of the drum, in order to make it easier to feed the machine and insure the passage of all the fresh milk to and against the inner wall of the drum. Passages 2 at the junction of the feeding-annulus with the inner wall of the drum permit the passage downward into the drum of the milk fed upon the top of the annulus from a spout, $j$, connected with a tank, $k$, or other fresh-milk supply, a suitable valve being placed in the spout to control the passage of fresh milk into the drum at the required time.

In the periphery of the drum are made two or more outlets, $l$, in which are placed valves or plugs $m$, herein shown as connected with the ends of arms $n$, the inner ends of the said arms being slotted, as at $o$, and fitted to a stem, $p$, shown as having a tapering head, 3, in which is placed a valve-mover, 4, shown as a rod connected with a hand-lever, 5.

At its bottom the drum is shown as provided with an outlet, $r$. (See Fig. 2.)

The driving-belt, as shown at $s$, will be driven in any usual way.

In practice the drum may be filled with milk to be creamed when stationary, the valves $m$ then stopping the outlets $l$; or the drum may be filled while in rotation. During the rapid rotation of the drum the arms $n$ are thrown outwardly, causing the valves m to close the outlets l and the stem p to rise, as shown in dotted lines, and by centrifugal action the heavier portion of the milk, denominated "skim-milk," separates itself from the cream of the milk, and is crowded or thrown next and in contact with the interior wall of the drum, while the lighter cream forms itself into a wall nearer the center of the drum. The heavy or skim-milk part being separated, as described, from the cream, the lever 5 and rod 4 are actuated to depress the stem p, causing it to operate the arms and withdraw the valves m from the outlets l, when the skim-milk is discharged outwardly from the drum through the said outlets into a suitable annular trough, x, which will be placed outside the drum, it leading the skim-milk to a suitable skim-milk receptacle. Fig. 1 shows at the left a portion of this trough. When the most of the skim-milk has been so discharged, fresh milk is supplied from the tank k to the drum by the spout j, the fresh milk so introduced above and upon the annular feeding-ring being conducted and delivered against the inner wall of the drum, where all the heavier portion of the milk (the skim-milk) left in the drum is contained, and the cream of this new supply of milk, as the milk and cream are separated, thickens the wall of cream at its outer side nearest the inner wall of the drum. In this way, by frequent discharges of skim-milk from the drum and feeding of fresh milk between the interior of the drum and the wall of cream, the latter is gradually thickened by the addition of cream to one side of the cream-wall, and the cream-wall is not torn and broken as would be the case if the drum were fed at the its center, and the heavier or skim-milk portion of the milk had to be forced through the cream-wall after each charge of fresh milk. In this way it will be noticed that the discharge of skim-milk and the feeding of fresh milk may be done while the machine is in full operation, which greatly expedites and facilitates the operation of creaming and saves time.

The cream-wall being of proper thickness and the skim-milk having been discharged, the cream may, by subsequent rotation of the drum, be discharged through the outlets l, the said outlets then being in communication with a proper trough and cream-receptacle; or, if desired, the machine may be slowed down to permit the cream to fall or settle at the bottom of the tank, where it may be drawn off through outlet r.

The drum will be provided with one or more partial partitions or wings, w, (see Fig. 2,) to cause the milk or other fluid containing particles of varying density to rotate with the drum.

I do not desire to limit my invention to a drum of the particular shape shown, or to valves such as shown, as they may be variously changed in shape, and yet be capable of operating in the manner described when separating the denser from the lighter liquid material.

It is desired to state that the machine may be employed with other liquid materials than milk when the heavier are to be separated from their lighter portions.

The drum h, at its top, is provided with an inwardly-turned flange, $h^2$, shown as made integral with the drum, such flange being necessary to prevent the milk rising above the top of the drum, which, by reason of the flange $h^2$, it will never do.

I claim—

1. In a centrifugal machine for creaming milk, the drum having solid bottom and sides and a connected internal feeding-annulus, and having perforations at its outer side, below the said annulus, to permit the discharge of the heavier liquid material, substantially as described.

2. The drum h, having solid bottom and sides and provided at its top with the inwardly-projecting flange $h^2$, forming a part thereof, and the annular shelf i, placed within and moving with the drum, combined with a spindle, e, supported at its lower end only, substantially as described.

3. The combination, in a centrifugal machine, of a revolving imperforate drum having vertical or lateral escape-openings therein and valves for regulating the escape of liquid through said openings, substantially as hereinbefore set forth.

In testimony whereof I have signed my name to this specification in the presence of two subscribing witnesses.

DAVID M. WESTON.

Witnesses:
G. W. GREGORY,
N. E. WHITNEY.